US009060196B2

(12) United States Patent
Torr et al.

(10) Patent No.: US 9,060,196 B2
(45) Date of Patent: Jun. 16, 2015

(54) CONSTRAINED EXECUTION OF BACKGROUND APPLICATION CODE ON MOBILE DEVICES

(75) Inventors: Peter John Torr, Bellevue, WA (US); Abolade Gbadegesin, Seattle, WA (US); Shawn P. Burke, Kirkland, WA (US); Vijayendra Gopalrao Vasu, Redmond, WA (US); Jason William Fuller, Bellevue, WA (US); Randal J. Ramig, Seattle, WA (US); Kunal R. Gandhi, Redmond, WA (US); Jorge I. Raastroem, Issaquah, WA (US); Darin Miller, Sammamish, WA (US); Alper Selcuk, Bellevue, WA (US); Timothy Michael Kurtzman, Redmond, WA (US); Rachel Jiang, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/162,936

(22) Filed: Jun. 17, 2011

(65) Prior Publication Data
US 2012/0210326 A1 Aug. 16, 2012

Related U.S. Application Data (60) Provisional application No. 61/442,753, filed on Feb. 14, 2011, provisional application No. 61/442,701, filed on Feb. 14, 2011, provisional application No. 61/442,713, filed on Feb. 14, 2011, provisional application No. 61/442,735, filed on Feb. 14, 2011, provisional application No. 61/442,740, filed on Feb. 14, 2011.

(51) Int. Cl.
*G06F 9/46* (2006.01)
*H04N 21/41* (2011.01)
(Continued)

(52) U.S. Cl.
CPC ......... *H04N 21/4126* (2013.01); *H04N 21/233* (2013.01); *H04N 21/439* (2013.01); *H04N 21/6175* (2013.01)

(58) Field of Classification Search
None
See application file for complete search history.

(56) References Cited

U.S. PATENT DOCUMENTS

| 5,655,081 A | 8/1997 | Bonnell et al. |
| 5,938,723 A | 8/1999 | Hales et al. |

(Continued)

FOREIGN PATENT DOCUMENTS

| TW | 201030506 A | 8/2010 |
| TW | 201037506 A | 10/2010 |

OTHER PUBLICATIONS

"iOS Application Programming Guide", Retrieved at <<http://developer.apple.com/library/ios/documentation/iphone/ conceptual/iphoneosprogrammingguide/iPhoneAppProgrammingGuide.pdf>>, Nov. 15, 2010, pp. 114.

(Continued)

*Primary Examiner* — Camquy Truong
*Assistant Examiner* — Mehran Kamran
(74) *Attorney, Agent, or Firm* — Kevin Sullivan; Kate Drakos; Micky Minhas (57) ABSTRACT

The subject disclosure is directed towards a technology by which background application code (e.g., provided by third-party developers) runs on a mobile device in a way that is constrained with respect to resource usage. A resource manager processes a resource reservation request for background code, to determine whether the requested resources meet constraint criteria for that type of background code. If the criteria are met and the resources are available, the resources are reserved, whereby the background code is ensured priority access to its reserved resources. As a result, a properly coded background application that executes within its constraints will not experience glitches or other problems (e.g., unexpected termination) and thereby provide a good user experience.

20 Claims, 7 Drawing Sheets

(51) Int. Cl.
*H04N 21/233* (2011.01)
*H04N 21/439* (2011.01)
*H04N 21/61* (2011.01)

(56) References Cited

U.S. PATENT DOCUMENTS

| | | | |
|---|---|---|---|
| 6,324,411 B1 | 11/2001 | Genell | |
| 6,683,938 B1 | 1/2004 | Henderson | |
| 6,874,145 B1 | 3/2005 | Ye et al. | |
| 7,124,424 B2 | 10/2006 | Gordon et al. | |
| 7,146,439 B1 | 12/2006 | Ofer et al. | |
| 7,234,035 B2 | 6/2007 | Jerding et al. | |
| 7,275,085 B1 | 9/2007 | Tran | |
| 7,346,855 B2 | 3/2008 | Hellyar et al. | |
| 7,512,952 B1 | 3/2009 | Liu et al. | |
| 7,535,456 B2 | 5/2009 | Liberty et al. | |
| 7,539,483 B2 | 5/2009 | Shi et al. | |
| 7,546,602 B2 | 6/2009 | Hejlsberg et al. | |
| 7,844,972 B2 | 11/2010 | Raja et al. | |
| 7,971,204 B2 | 6/2011 | Jackson | |
| 8,082,008 B2 | 12/2011 | Hoffman et al. | |
| 8,175,653 B2 | 5/2012 | Smuga et al. | |
| 8,196,213 B2 | 6/2012 | Klucher et al. | |
| 8,418,186 B2 | 4/2013 | Jackson | |
| 8,499,312 B2 | 7/2013 | Naresh et al. | |
| 8,510,743 B2 | 8/2013 | Hackborn et al. | |
| 8,515,797 B2 | 8/2013 | Ernst et al. | |
| 2002/0012329 A1 | 1/2002 | Atkinson et al. | |
| 2002/0104097 A1* | 8/2002 | Jerding et al. | 725/115 |
| 2003/0061260 A1* | 3/2003 | Rajkumar | 709/104 |
| 2003/0117440 A1 | 6/2003 | Hellyar et al. | |
| 2003/0227567 A1 | 12/2003 | Plotnick et al. | |
| 2004/0102861 A1 | 5/2004 | Han | |
| 2004/0194153 A1 | 9/2004 | Garg et al. | |
| 2005/0022157 A1 | 1/2005 | Brendle et al. | |
| 2005/0026654 A1 | 2/2005 | Perez et al. | |
| 2005/0120306 A1 | 6/2005 | Klassen et al. | |
| 2005/0172326 A1* | 8/2005 | Jerding et al. | 725/116 |
| 2005/0278449 A1* | 12/2005 | Moss et al. | 709/228 |
| 2006/0136882 A1 | 6/2006 | Noonan et al. | |
| 2006/0213754 A1 | 9/2006 | Jarrett et al. | |
| 2006/0236368 A1* | 10/2006 | Raja et al. | 726/1 |
| 2006/0245237 A1 | 11/2006 | Nguyen et al. | |
| 2006/0265726 A1 | 11/2006 | Byun et al. | |
| 2006/0288336 A1 | 12/2006 | Trowbridge et al. | |
| 2007/0036137 A1 | 2/2007 | Horner et al. | |
| 2007/0038763 A1 | 2/2007 | Oestvall et al. | |
| 2007/0068367 A1 | 3/2007 | Schmidt et al. | |
| 2007/0094665 A1* | 4/2007 | Jackson | 718/104 |
| 2007/0220445 A1 | 9/2007 | Yach et al. | |
| 2007/0223533 A1 | 9/2007 | Kirrmann et al. | |
| 2007/0244586 A1 | 10/2007 | Champion et al. | |
| 2007/0294699 A1* | 12/2007 | Bahl et al. | 718/104 |
| 2008/0052717 A1 | 2/2008 | Lee | |
| 2008/0066006 A1 | 3/2008 | Kim | |
| 2008/0082936 A1 | 4/2008 | Helvick | |
| 2008/0125180 A1* | 5/2008 | Hoffman et al. | 455/566 |
| 2008/0154601 A1 | 6/2008 | Stifelman et al. | |
| 2008/0172698 A1* | 7/2008 | Berger et al. | 725/50 |
| 2008/0222153 A1 | 9/2008 | Naresh et al. | |
| 2009/0028127 A1* | 1/2009 | Walker et al. | 370/348 |
| 2009/0113444 A1 | 4/2009 | Hackborn et al. | |
| 2009/0227279 A1 | 9/2009 | Yuki et al. | |
| 2009/0249247 A1 | 10/2009 | Tseng et al. | |
| 2009/0300192 A1 | 12/2009 | Northrup | |
| 2009/0327953 A1 | 12/2009 | Honkala et al. | |
| 2010/0011446 A1* | 1/2010 | Klucher et al. | 726/27 |
| 2010/0115048 A1 | 5/2010 | Scahill | |
| 2010/0138834 A1 | 6/2010 | Agarwal et al. | |
| 2010/0153877 A1 | 6/2010 | Rautava et al. | |
| 2010/0248787 A1 | 9/2010 | Smuga et al. | |
| 2010/0250998 A1 | 9/2010 | Herdrich et al. | |
| 2010/0262973 A1 | 10/2010 | Ernst et al. | |
| 2010/0281481 A1 | 11/2010 | Rainisto et al. | |
| 2010/0289760 A1 | 11/2010 | Jonoshita et al. | |
| 2011/0035554 A1 | 2/2011 | Watson et al. | |
| 2011/0087989 A1 | 4/2011 | McCann et al. | |
| 2011/0151885 A1* | 6/2011 | Buyukkoc et al. | 455/452.1 |
| 2011/0202847 A1 | 8/2011 | Dimitrov | |
| 2011/0252430 A1 | 10/2011 | Chapman et al. | |
| 2011/0258323 A1* | 10/2011 | Jackson | 709/226 |
| 2012/0081308 A1 | 4/2012 | Sirpal | |
| 2012/0102497 A1* | 4/2012 | Stahl | 718/103 |
| 2012/0102504 A1 | 4/2012 | Iyer et al. | |
| 2012/0106463 A1* | 5/2012 | McBride et al. | 370/329 |
| 2012/0158827 A1 | 6/2012 | Mathews | |
| 2012/0158829 A1 | 6/2012 | Ahmavaara et al. | |
| 2012/0185532 A1* | 7/2012 | Kristiansson et al. | 709/203 |
| 2012/0209413 A1 | 8/2012 | Xu et al. | |
| 2012/0209946 A1 | 8/2012 | McClure et al. | |
| 2012/0210266 A1 | 8/2012 | Jiang et al. | |
| 2012/0210321 A1 | 8/2012 | Silva et al. | |
| 2012/0258722 A1* | 10/2012 | Liu | 455/450 |
| 2012/0265874 A1 | 10/2012 | Hoh et al. | |
| 2013/0115990 A1 | 5/2013 | Koc et al. | |
| 2014/0019873 A1 | 1/2014 | Gupta et al. | |

OTHER PUBLICATIONS

Allen, Mitch, "Palm WebOS Rough Cuts", Retrieved at <<http://justinput.googlecode.com/files/ Palm_webOS_Rough_Cuts.pdf>>, Palm webOS, 1st Edition, Sep. 2, 2009, pp. 302. (*PDF of reference is uploaded in two parts due to file size).

Fei, et al., "An Energy-aware Framework for Coordinated Dynamic Software Management in Mobile Computers", Retrieved at <<http://www.engr.uconn.edu/~yfei/publications/files/mascots04.pdf>>, Oct. 2004, pp. 12.

Mikic-Rakic, et al., "Middleware for Software Architecture-Based Development in Distributed, Mobile, and Resource-Constrained Environments", Retrieved at <<http://sunset.usc.edu/~neno/papers/Prism/PrismMW.pdf>>, Feb. 2002, pp. 13.

Kunz, et al., "An Architecture for Adaptive Mobile Applications", Retrieved at <<http://citeseerx.ist.psu.edu/viewdoc/download?doi=10.1.1.40.624&rep=rep1&type=pdf>>, May 13, 1999, pp. 12.

"International Search Report", Mailed Date: Sep. 26, 2012, Application No. PCT/US2012/024789, Filed Date: Feb. 12, 2012, pp. 9.

"Windows Phone 7 with multitasking—coming soon", Retrieved at <<http://mobile.dzone.com/articles/windows-phone-7-multitasking>>, Retrieved on Feb. 25, 2011, pp. 2.

"International Search Report", Mailed Date: Sep. 17, 2012, Application No. PCT/US2012/024790, Filed Date: Feb. 12, 2012, pp. 9.

"BlackBerry Tablet OS SDK for Adobe AIR", Retrieved at <<http://docs.blackberry.com/en/developers/deliverables/24118/BlackBerry_Tablet_OS_SDK_for_Adobe_AIR-Development_Guide—1449712-0112050519-001-0.9.2_Beta-US.pdf>>, Feb. 17, 2011, pp. 117.

"Running your app in the background (tombstoning)", Retrieved at <<http://create.msdn.com/en-US/education/quickstarts/Running_your_App_in_the_Background_(Tombstoning)>>, Retrieved on Feb. 28, 2011, pp. 7.

"Samsung Galaxy S—Goodbye Task Killer", Retrieved at <<http://forum.vodafone.co.uk/t5/Galaxy-S/Samsung-Galaxy-S-Goodbye-Task-Killer/m-p/513640>>, Retrieved on Feb. 28, 2011, pp. 5.

"Windows Phone and multitasking", Retrieved at <<http://windowsphonesecrets.com/2010/05/20/windows-phone-and-multitasking/>>, Retrieved on Feb. 28, 2011, pp. 2.

"International Search Report", Mailed Date: Aug. 31, 2012, Application No. PCT/US2012/024024, Filed Date: Feb. 6, 2012, pp. 10.

Chen, Brian X., "Wired.com Explains: How Mobile Multitasking Works", Retrieved at <<http://www.wired.com/gadgetlab/2010/07/mobile-multitasking-explainer/>>, Jul. 1, 2010, pp. 5.

"Executing Code in the Background", Retrieved at http://developer.apple.com/library/ios/#documentation/iphone/ conceptual/iphoneosprogrammingguide/BackgroundExecution/BackgroundExecution.html>>, Retrieved on Feb. 25, 2011, pp. 9.

"Application Fundamentals", Retrieved at <<http://developer.android.com/guide/topics/fundamentals.html>>, Retrieved on Feb. 25, 2011, pp. 7.

(56) References Cited

OTHER PUBLICATIONS

"How Multitasking Works in the New iPhone OS 4.0", Retrieved at <<http://gizmodo.com/#5512656/how-multitasking-works-in-the-new-iphone-os-40>>, Retrieved on Feb. 25, 2011, pp. 6.
"WP7: Background Execution—Really?", Retrieved at <<http://blog.jayway.com/2011/01/11/wp7-background-execution-really/>>, Retrieved on Feb. 25, 2011, pp. 8.
"iPhone OS 4.0 Background Services Explained", Retrieved at <<http://thecircu.it/news/2010/4/9/iphone-os-40-background-services-explained.html>>, Retrieved on Feb. 25, 2011, pp. 6.
"Multitasking the Android way", Retrieved at <<http://android-developers.blogspot.com/2010/04/multitasking-android-way.html>>, Retrieved on Feb. 25, 2011, pp. 6.
Non-Final Office Action cited in U.S. Appl. No. 13/164,678, dated Aug. 29, 2013, 9 pages.
"Office Action and Search Report Received for Taiwan Patent Application No. 101102210", Mailed Date: Sep. 3, 2014, 13 Pages.
"Final Office Action Received for U.S. Appl. No. 13/162,096", Mailed Date: Oct. 25, 2013, 22 Pages.
"Non-Final Office Action Received for U.S Appl. No. 13/162,096", Mailed Date: Sep. 11, 2014, 20 Pages.
"Non-Final Office Action Received for U.S Appl. No. 13/162,096", Mailed Date: Jan. 17, 2013, 22 Pages.
"Non-Final Office Action Received for U.S Appl. No. 13/162,459", Mailed Date: Dec. 20, 2013, 13 Pages.
"Non-Final Office Action Received for U.S Appl. No. 13/162,459", Mailed Date: Jun. 24, 2014, 15 Pages.
"Non-Final Office Action Received for U.S Appl. No. 13/164,497", Mailed Date: Jan. 17, 2014, 18 Pages.
"Final Office Action Received for U.S Appl. No. 13/164,678", Mailed Date: Feb. 24, 2014, 10 Pages.
"Non-Final Office Action Received for U.S Appl. No. 13/164,678", Mailed Date: Jun. 20, 2014, 11 Pages.

* cited by examiner

CONSTRAINED EXECUTION OF BACKGROUND APPLICATION CODE ON MOBILE DEVICES

CROSS-REFERENCE TO RELATED APPLICATIONS

The present application claims priority to U.S. provisional patent applications Ser. nos. 61/442,701, 61/442,713, 61/442,735, 61/442,740 and 61/442,753, each filed Feb. 14, 2011 and hereby incorporated by reference. The present application is related to U.S. patent applications, assigned to the assignee of the present invention, and hereby incorporated by reference.

BACKGROUND

People want mobile devices to be able to do many things at once, such as browse the web, play music, notify them of certain events, and so forth. No single application can practically accomplish the many possible tasks, so mobile devices are configured with several distinct applications, as well as with the ability to download more applications from "third-party" application vendors (including when the vendor is the same entity as the "first party" provider of the mobile device).

At present, applications are run separately on mobile devices, (in contrast to relatively high-powered computing devices such as PCs where they may be run in parallel). It is desirable to run applications "at the same time" on mobile devices as well, in order to give the user a more desirable experience. This is problematic for a resource-constrained device such as a mobile device, given its computing power, limited screen real-estate, battery, network bandwidth, and so on.

Various approaches have been taken to this in the past. Like traditional desktop operating systems, some mobile operating systems simply run the various applications in parallel, assuming that system has sufficient resources to accomplish all active tasks and that the user can manage the user experience (UX, including user interface or UI) issues. This tends to lead to poor user experiences, as glitches and other problems occur when resources are not sufficient. Other platforms allow one or more applications to continue executing even after the user has switched away from them, but they provide no guarantees about continuity (quality) of service; e.g., if resources start to run out, applications are terminated.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which background code is allowed to run in a resource-constrained way, with priority given to the background code to use the reserved resources (e.g., under non-exceptional operating conditions). Upon receiving a reservation request that requests device resources for background code, a resource manager determines whether policy criteria is met for the reservation request, including that sufficient resources (e.g., CPU and memory) are available to ensure that the background code is able to have priority use of the device resources being requested. If so, the device resources are reserved for use by the background code. If sufficient resources are not available, the request is failed. In this way, for example, background code is ensured to run with sufficient resources to avoid glitches, to not be unexpectedly terminated, and so forth.

The policy criteria generally include constraint limits for a type of background code corresponding to the reservation request. For example, a background audio player agent is only allowed to request allocation of a limited amount of memory allocation. The policy criteria also generally include data indicating which resources are allowed and/or denied use by the background code, e.g., turn-by-turn navigation background code may use a GPS mechanism as a resource, but may not use not the screen display.

In one aspect, an application instance manager launches an instance of the background code for execution when the reservation request is successful. The application instance manager is further configured to manage a lifecycle of the background code, including moving at least part of the background code between an active state in which the background code executes and a dormant state in which the background code does not execute.

In one aspect, there is described receiving a service request from an application, the request including a request to reserve resources for a background agent. A process (e.g., corresponding to the resource manager) determines whether to reserve the resources for the background agent, and if so, reserves the resources. The background agent is invoked to execute code, (e.g., to communicate with a system service to perform at least one background task, including when the application is closed). When the background agent and reserved resources are no longer needed, the resources are freed and the reservation is relinquished.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology by which background application code is configured and allowed to run, but is constrained by the system with respect to resource usage. This allows third-party developers to provide code that may execute as non-foreground code. Example background code scenarios include background audio playback, periodically checking into social networking sites, background download of content for later use in the foreground, scheduling alarms and notifications, and so forth. Some of these scenarios (e.g., background audio playback, social networking check-in, geo-fencing/geo-caching, and so forth) may operate by having application code run in the background.

To this end, there is described a centralized service for managing the lifetime and execution of background application code, along with a resource management system that protects foreground experiences from background application execution, while still enabling background applications to make execution progress. Also described is a mechanism that generally guarantees a given experience can be started in the future, (e.g., providing the system itself is not in an exceptional state).

In general, before background application code is allowed to run, the background application code requests that certain amounts of resources (e.g., CPU usage and memory) and/or types of resources (e.g., peripheral devices) be reserved for its usage. If the requests are within/meet acceptable policy constraints for that type of background application code, and the requested resources are available at that time, the requested resources are reserved for the background application code, (otherwise the request is failed). If reserved, the resources are guaranteed to be available to the background application code under typical device operation (that is, except for possibly extraordinary circumstances). In this way, a background resource is constrained with respect to the resources it may request and reserve, but if successfully reserved, the resources will be available if and when needed. As a result a background application that is properly coded to execute within its constraints will not experience glitches or other problems (e.g., unexpected termination) and thereby provide a good user experience.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and mobile devices in general.

Figure 1:
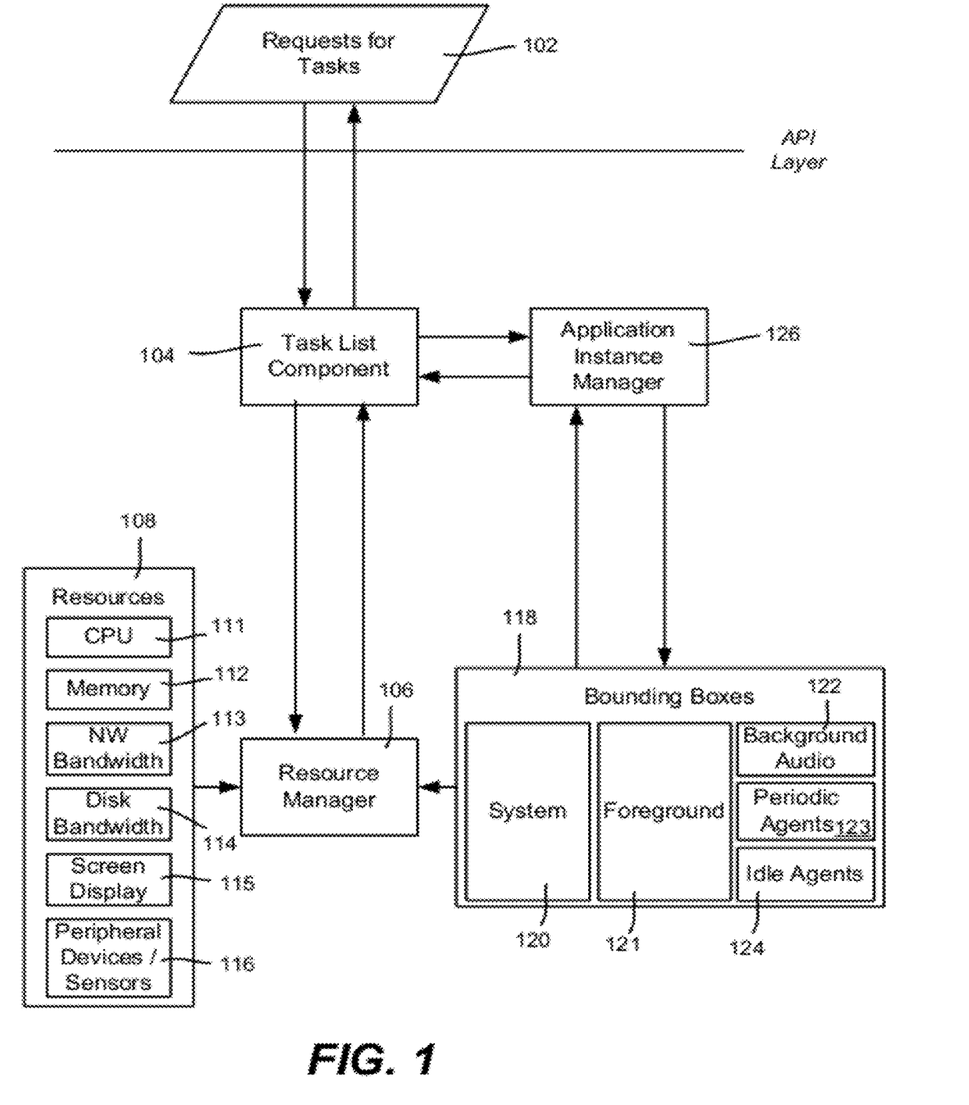
FIG. 1 is a block diagram representing example components for managing resources, including providing a constrained set of resources to background application code.

FIG. 1 is a block diagram showing various components in one example implementation including an application model that provides background execution in a mobile device such as a Windows® phone. To this end, requests 102 related to application tasks are managed by a task list component 104 of (e.g., of the system shell) that controls an application resource manager 106.

In general, the resource manager 106 allocates system resources 108 such as those shown in blocks 111-116 to the processes that are hosted on the device. In addition to the CPU 111 and memory 112 resources, resources may include network bandwidth 113, disk bandwidth 114 (I/O for any non-volatile storage type, not necessarily a disk), the screen display 115, and peripheral devices/sensors 116 such as the device microphone, the device camera, accelerometer, gyroscope, a GPS mechanism and so forth.

Types of processes include system processes, foreground processes and background agent processes. Processes that work together to perform functionality are referred to as "workloads" herein, (although it is feasible that a workload may also comprise a single process). For example, FIG. 1 thus shows a system workload 120, foreground workload 121 and background agent workloads 122-124.

Each type of workload 124 is guaranteed an amount of each resource that is predetermined to be needed relevant by that process type, generally represented in FIG. 1 as "bounding boxes" 118. For example, some amount of CPU 111 and memory 112 are needed by each background workload (or agent process) and reserved for that workload when initially requested, or the request is failed if not enough resources are available. The amount of each resource that is guaranteed (if not failed) may correspond to a class of the corresponding application, e.g., a background audio agent may be given so much memory and CPU, while a different background agent may be given a different amount of memory and CPU.

The resource manager 106 enforces policies for controlling access to certain resources (such as the camera or microphone) to prevent them from being accessed by a background agent, for example. As another example, the foreground workload 121 gets the screen display resource, which background processing workloads cannot reserve. Other resources and additional details regarding resource reservations are described below.

Thus, components of the application model described herein include system processes/workloads, foreground applications/workloads comprising pieces of application code that comprise the user experience (UX, comprising user interface components) of the application and may also contain significant business logic needed for presenting that UX. Components of the application model also include background agents/workloads, comprising pieces of code that perform the actual work of an application (e.g., streaming music, performing geo-location services, and so on, including after the foreground application is closed) but generally contain no visible user interface components. Background agents are related to, but independent from, the foreground application; in one implementation, background agents run inside an agent host (where a host comprises a process that contains one or more of an application's task instances).

Resource management-related functions of the task list component 104 include instantiating an appropriate type of workload (one or more processes, as described herein), such as when a session (a user interface workload) is launched or when a background agent host is created, and deleting a workload when the hosts in the workload terminate. The task list component 104 also attaches/detaches workloads to/from reservations (corresponding to bounding boxes) as workload states change from active to inactive and vice-versa. The task list component 104 monitors host creations and adds each created host to the appropriate workload, monitors host terminations and removes a terminated host from its workload, and monitors host state changes and changes the state of its containing workload if needed.

In one implementation, components directed towards background execution also include an application instance manager 126 (AIM), comprising a central service that manages the lifetime of background agents/workloads 122-124 and dispatches work to them on behalf of clients. Other components directed towards background execution include background services (such as a media service) that leverage one or more background agents to perform individual work items (such as queuing up media to play). System UX is also provided, such as playback controls or toast notifications, which enable the user to interact with background agents (and vice-versa) in a limited fashion.

The system workload 120 comprises various system processes. In one implementation, there is only one instance of this type. System processes (such as TelShell.exe 440 and NK.exe 442, FIG. 4 along with ServicesD.exe, and others belong to this workload, and no hosts do.

Some of the functionality provided by the system workload 120 includes system-provided foreground UI, such as including the lock screen, chrome elements (application bar, toasts, and so forth), incoming phone call experience, alarms and reminders and so forth. System-provided background audio playback, comprising a built-in music playback by a media service (554, FIG. 5, e.g., a Zune® Media Queue), does not use any hosts for media decoding or playback control. The system workload 120 may also perform background processing, such as email synchronization, downloading and installing updates and applications, and so forth.

Processes in the system workload 120 often do work on behalf of processes in other workloads. For example, if the foreground task instance makes a protected server library (PSL) method call into TelShell.exe, TelShell.exe will use resources to execute this PSL method. Note that the system does not have the ability to measure resource usage within a server process and attribute it to a client (or requesting) process, and therefore resource usage by such a process is considered to be part of the system workload itself.

A UI workload comprises a set of UI hosts working together to provide a UI-based, visual user experience. The UI pages displayed by a UI workload form a session, that is, there is a one-to-one mapping between a UI workload and a session. No system processes are included in this type of workload.

The UI workload that contains the active UI host is referred to as the active UI workload, which is the UI workload that is currently displaying UI in the foreground, (e.g., the foreground workload 121). Other UI workloads are considered to be inactive. Because there is only one active UI host at a time, there is only one active UI workload at any given time. Sometimes, when the system workload 120 is providing the foreground UI, there may be no active UI workload (e.g., when the lock screen is displayed). There can be several inactive UI workloads at the same time, with the number determined by the size of the backstack (which is controlled by the Frame Server component of TelShell, as described in one or more of the related applications).

One implementation of the application model specifies that hosts in the active UI workload successfully finish deactivating or canceling, in contrast to hosts contained within inactive UI workloads. A UI workload terminates when the UI hosts within it terminate. A UI host normally terminates because it exits after its task instances have completed, or because it is dehydrated after its task instances have finished deactivating.

Further described herein are components that facilitate background workload scenarios, including the above-described application resource manager 106 that manages resource consumption by hosts. A background UX workload comprises background hosts working together to provide a non-visual user experience, such as background audio playback or turn-by-turn directions, playing back a video stream to an external display while reading email on the phone, (e.g., using DLNA/Digital Living Network Alliance technology), and the like. Note that no system processes need be included in this type of workload.

The Background UX workload that contains an active background host is referred to as an active Background UX workload. Background UX workloads that only contain inactive background hosts are considered to be inactive.

Background audio playback using third-party media decoders and/or playback agents are feasible (and described in one or more of the related applications). At any given time, a media service is playing at most one playlist, which is owned by one application; via policy, at most one media item from a playlist can play at a time. Also, the background agents for a particular playlist are hosted in the same background host. These constraints, taken together, imply that in such one implementation, there can be at most one Background UX workload active at a time. They also imply that each Background UX workload contains one background host.

Figure 2:
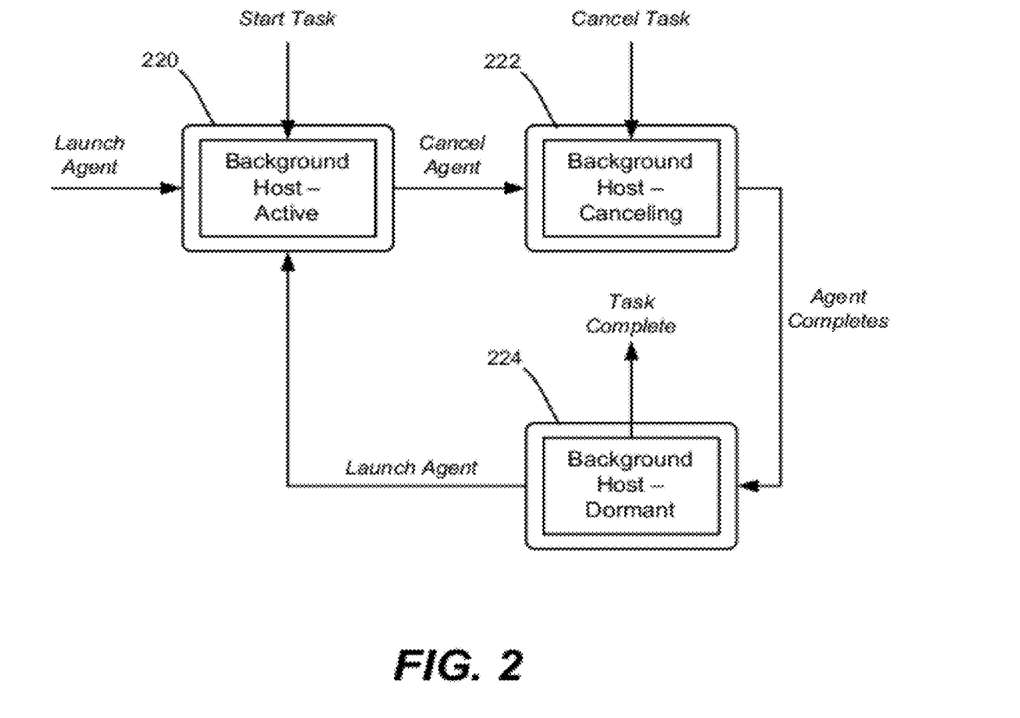
FIG. 2 is a block/control flow diagram representing an example background code lifecycle.

FIG. 2 illustrates the lifecycle of a Background UX workload. As represented by block 220, launching an agent creates an active background UX workload, or alternatively activates an inactive background UX workload. Canceling the agents in the host (block 222) makes the background UX workload inactive. When the agents in the host complete, the host may become dormant (block 224; dormant applications are described in one or more of the related applications). Hosts in an inactive Background UX workload are not required to be allowed to successfully finish canceling.

A background UX workload terminates when the background hosts within it terminate. A background host normally terminates only after all its background agents have completed, when it is told by the application model to exit.

Another type of background workload is a background processing workload which comprises a set of background hosts working together to perform some background processing on behalf of an application; (unlike a background UX workload, a background processing workload does not provide any user experience, and the user is typically not aware that this workload exists). Examples of background processing workloads include periodically updating the user's location to a server from the background, downloading media when the phone screen is off, and the like. Note that no system processes need be included in a background processing workload.

In one implementation, each background processing workload contains one background host. The background processing workload that contains an active background host is referred to as an active background processing workload; background processing workloads that only contain inactive background hosts are considered to be inactive.

Multiple applications may register for background processing, however one implementation allows at most one active background processing workload at a time. If multiple background processing workloads are scheduled to execute at the same time, it is acceptable to serialize their execution, or if resources allow it, to execute them in parallel (e.g., which consumes less battery). Hosts in an inactive background processing workload are not requested to successfully finish canceling; the lifecycle and state transitions of background processing workloads are similar to those of background UX workloads.

One other type of workload is an opportunistic workload, which are not required to have any host successfully complete its job. Inactive workloads (inactive UI, inactive background UX and inactive background processing workloads) are instances of the opportunistic workload type.

As described herein, part of the resource management strategy is to only support a feature if known in advance that there are sufficient resources to support implementing the feature with a proper user experience; a new workload is not added system if that workload can cause the device itself or existing workloads to stop working properly. In other words, support is provided for a particular workload only if it is known that (in typical cases), the processes of that workload have sufficient resources to execute well. An exception to this is with respect to opportunistic workloads, that is, opportunistic workloads need not run successfully to completion, and thus sufficient resources need not be ensured.

To this end, "working properly"/"being healthy" with respect to a workload in may be predetermined in terms of its canonical resource requirements. For every workload type, the amount of each resource that a well-written instance of that workload type needs in order to provide a good user experience is predetermined, e.g., by analysis. Note that determining the amount of each resource needed by the system workload is given attention, as the system workload can do work on behalf of other workloads, and thus system processes need to account for the amount of resources they need to service their clients, and include this resource requirement in their resource requirements.

At run time, if a particular workload is getting at least the amount of resources needed by its workload type that particular workload is considered to be healthy. By way of example, consider that (e.g., via experimentation) that almost all UI workloads require at most 75% of the CPU every 16 ms to work well when active. At run time, as long as the currently active UI workload is able to get at least 75% of the CPU every 16 ms, it is deemed to be healthy (with respect to CPU usage, that is).

In the event that an ill-behaved workload needs more resources than it is anticipated for its type, such a workload is not considered to work correctly within the constraints of the assigned resource requirements. To avoid interfering with other workloads, in one implementation, such workloads are not allocated more resources to attempt to make them healthy.

Figure 3:
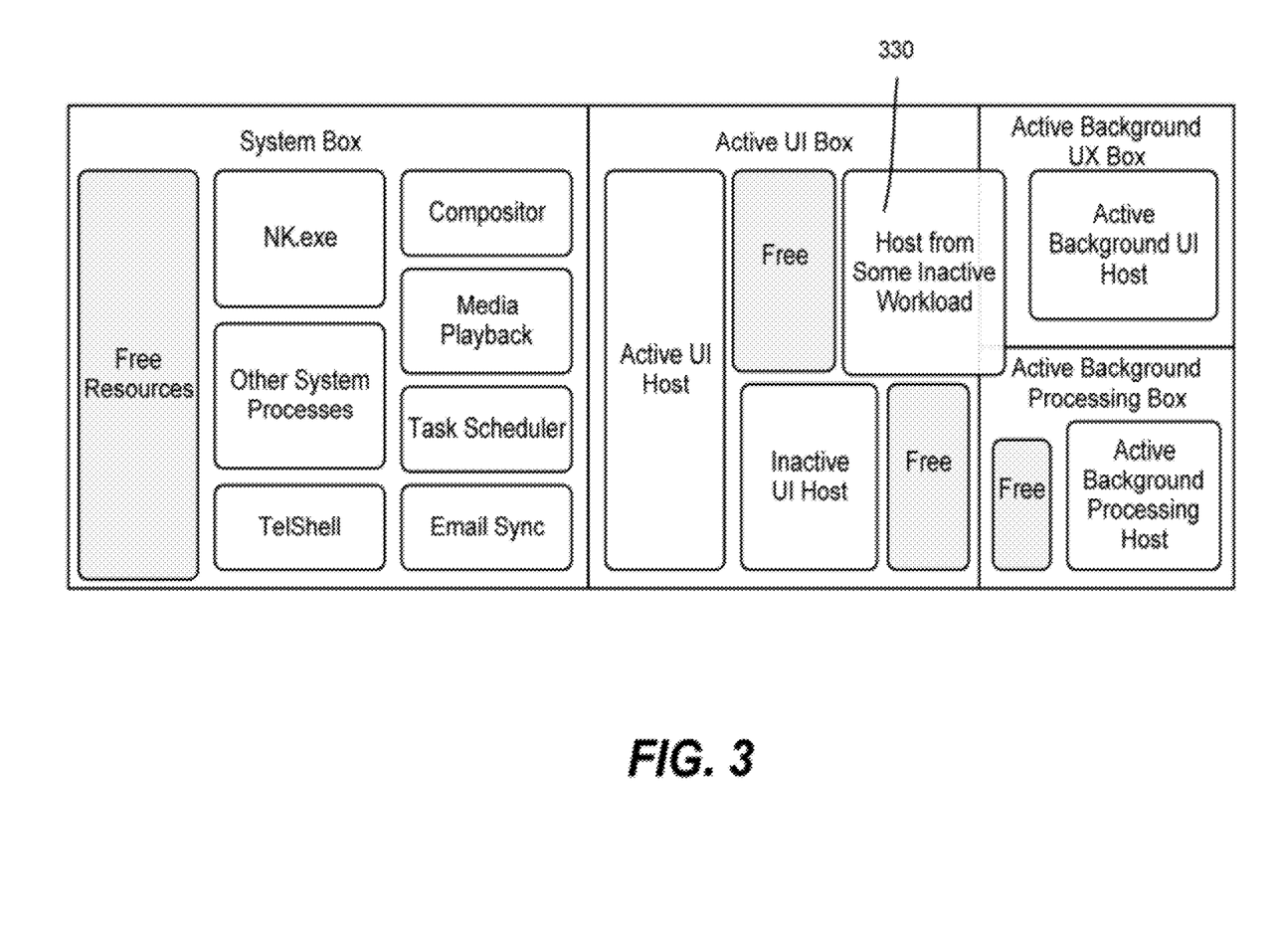
FIG. 3 is a representation of resource bounding boxes for various workloads (sets of processes).

FIG. 3 shows a conceptual view of workloads and their bounding boxes, in which shaded boxes represent free resources. Note that with respect to the block labeled 330, "Host from Some Inactive Workload," it is noted that hosts from inactive workloads are allowed to live only if resources are free.

Each workload, corresponding to a reservation, may be considered as being in a bounding box whose size is determined by the amount of resources its workload type requires to be healthy; (note that the sizes of the workloads in the illustrated boxes are not necessarily representative and/or relative sizes). For example, a background audio workload needs some amount of memory, some CPU time and so forth in order to smoothly play audio without glitches or other interruptions that are noticeable to a user. Conceptually, there may be a different bounding box for each type of resource that can be divided up among workloads.

To decide whether to allow a new background workload or not, the system checks whether the bounding box (e.g., per resource) of the workload for that scenario fits on the device or not, based on any other current resource allocations. If it does, the system allows the scenario; if not, the scenario is not allowed (the reservation request is failed). Alternatively, the resource requirements of an existing scenario may be evicted or revised, so that resources become available for the new scenario. Negotiation is also feasible, e.g., after denying the reservation, the reservation request may be resubmitted for some lesser amount of resources, so that, for example, a background workload that is written to be able to operate in some reduced operating mode may do so.

In order to keep the workloads (except the opportunistic workloads) healthy at run time, the application resource manager ensures that a process has highest priority access to resources within its own bounding box. In other words, the application resource manager ensures that for every bounding box X, a resource request from a process belonging to X will fail only when any processes not belonging to X have been evicted from X, and there still are not enough resources to satisfy the request. Thus, the system workload for example may use reserved resources, such as for a memory cache, and/or use more CPU, however the system does not have the reservation and is coded to understand that the cache may need to be freed and that it may or may not receive extra CPU.

Note that there is a practical constraint on the general resource management strategy, in that limiting the processes of the system workload to a bounding box and failing their resource requests when this bounding box is full may have unpredictable results and/or may cause the device to become unstable. In one implementation, the bounding box of the system workload is allowed to grow when system processes need more resources. Such a growth may mean that the bounding box of some other workload shrinks in size, causing that workload to become unhealthy, which nevertheless is more desirable than allowing the system workload (which provides more significant functionality like a phone call experience) to become unhealthy. Thus, the resource "guarantee" made to non-system workloads is subject to exceptions, including for an extraordinary circumstances such as when the system workload's bounding box becomes full and needs to grow.

Figure 4:
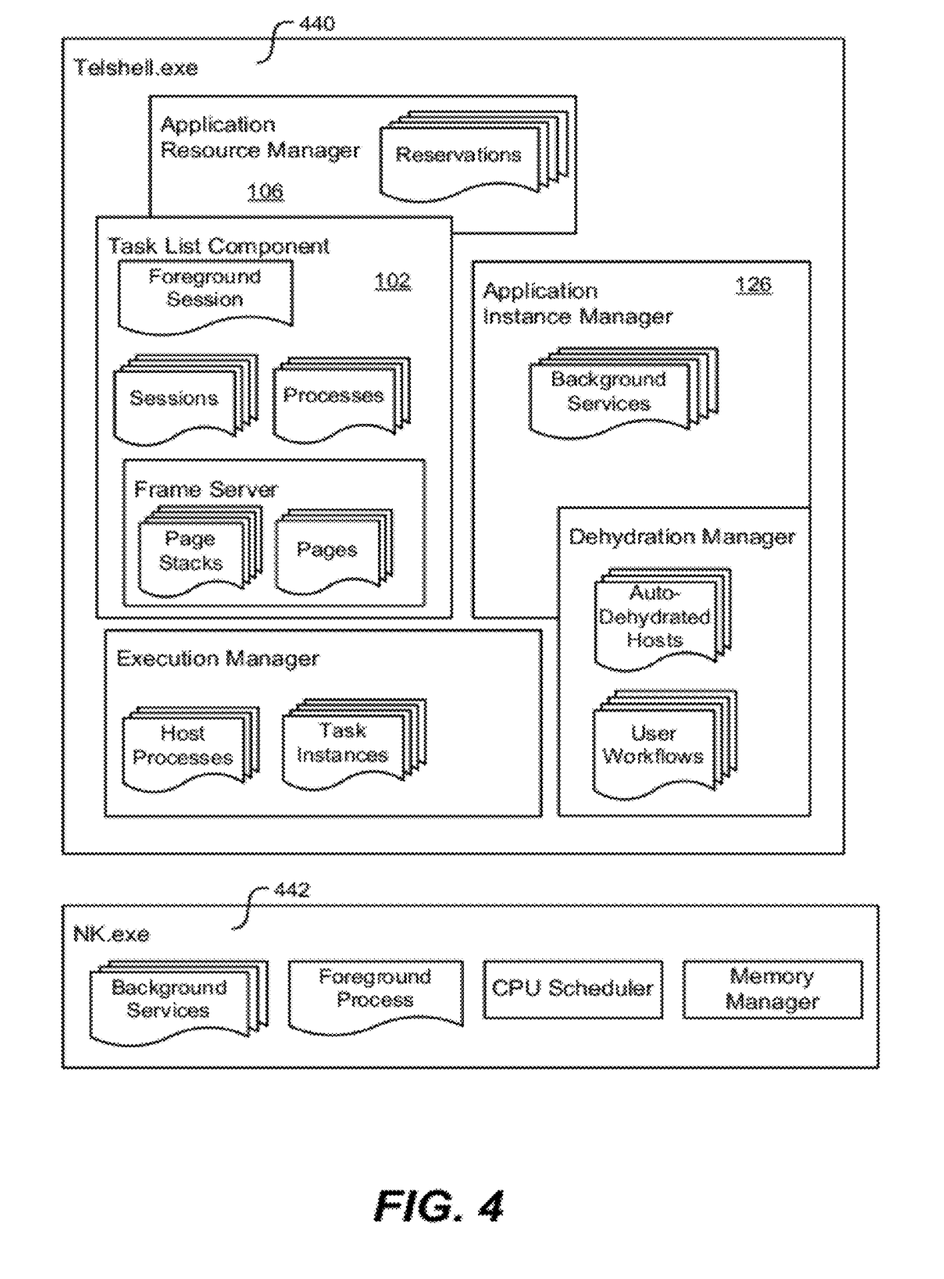
FIG. 4 is a representation of an example application model architecture application model including components configured to provide background code execution in a mobile device.

FIG. 4 further illustrates additional details of the integration of the application resource manager 106 into the architecture of one example implementation of an application model. In one implementation, the application resource manager 106 comprises a static library that resides in the system shell's (TelShell) process 440. The application resource manager 106 operates to maintain reservations, wherein a reservation is essentially equivalent to the bounding box discussed earlier, and comprises a set of resource quotas. A resource quota may be in the form of a (resource type, size) tuple, which describes how much of a resource is reserved for a reservation. For example, the following reservation contains two resource quotas/tuples that may be set: {(CPU, 10% every 5 seconds), (Memory, 10 MB)} which reserves ten percent of the CPU every five seconds, and ten megabytes of memory.

When a reservation has a workload associated with it, the application resource manager 106 operates to ensure that the processes of the workload have the highest priority access to the resources of the reservation. Thus, if the active background UX workload is assigned to the reservation in the example above, the application resource manager makes sure that the hosts in the active background UX workload can collectively use at least 10 MB of memory and 10% of the CPU every 5 seconds.

A reservation contains one or more resource quotas. A workload contains one or more hosts. At any given time, a reservation is associated with one workload. A workload can be associated with one reservation at a time. Each host is in one workload at any given time; (technically a host may be in multiple workloads at the same time, although this may be disallowed by the model). A host may be in different workloads at different times, although, it may not be possible to move a host from a bigger bounding box to a smaller one, because some of the resources that it is currently consuming (like memory), may not be reclaimable.

By way of one example of typical interactions between the system components described herein, background media playback is used in an example. Note that the same pattern generally exists for other scenarios involving background execution of application code such as location tracking, data syncing, VoIP calling, turn-by-turn directions, and so on.

Figure 5:
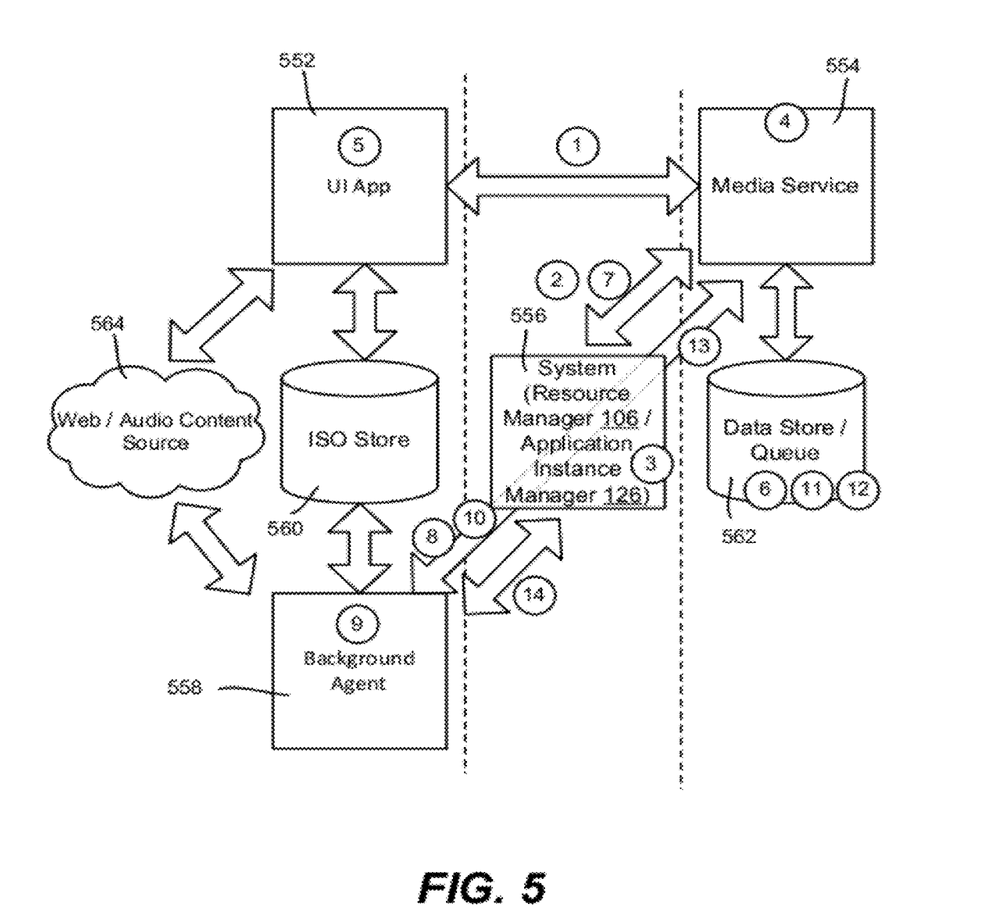
FIG. 5 is a block/control flow diagram representing example operations to prepare background code to play background audio.

As represented in FIG. 5, consider that a user launches a foreground application 552 in order to initiate an audio experience. Using the foreground application 552, the user chooses the parameters of the desired background experience (for example, the list of music tracks to play in the background).

FIG. 5 shows basic blocks and a data/control flow of a scenario for media playback. Note that as shown, the application 552 and agent 558 have their own isolated storage 560, and the media service has its own data store 562, which may include a queue. The following labeled steps correspond to the circled numerals in FIG. 5:

1. Application creates service request ("play this track and call me back when you need the next one")
2. Service asks system to reserve resources for the agent experience
3. System reserves resources to ensure agent can perform its work in the future
4. Service starts playing the track
5. User closes application
6. Current track ends
7. Service asks system to call the agent to get the next track
8. System starts new process and invokes the agent
9. Background agent performs logic and provides the next track information
10. System suspends or kills the agent
11. Current track ends . . . (back to step 5)
12. Playback completes
13. Service notifies system that reservation is no longer needed
14. System relinquishes reservation.

As can be seen, the foreground application 552 creates the background service 554 (via an API call) and submits a service request to the media playback background service 554, asking it to perform audio playback on its behalf. The media playback background service 554 asks the system 556 (the resource manager 106 of FIGS. 1 and 4) to reserve some resources for a background agent 558 so that it can be executed at a future point in time, with a high certainty of succeeding (note that an exception such as a failure in the operating system itself may prevent such an execution). Assuming the reservation is successful, the media playback background service 554 starts the audio playback experience.

When the media playback background service 554 determines that it needs the participation of application code in order to continue providing the experience (e.g., the URL of the next track to play), the background service submits a work item to the system 556, (e.g., the application instance manager 126 in FIGS. 1 and 4). The application instance manager 126 attempts to find a suitable agent host in which to run the background agent 558. If no such host exists, a new one is created, using the resources previously reserved by the resource manager 106. Suitable resource constraints such as amount of memory and CPU that the agent can use are applied at this time.

A work item is dispatched to the background agent 558, which carries out the application-specific logic needed to satisfy it, for example, connecting to a web service 564 to download the track metadata and supplying that data to the media playback background service 554.

Once the background agent 558 has completed its work item, the application instance manager 126 is free to reclaim its resources as desired (e.g., by suspending its execution or terminating it completely). However, the agent may still remain dormant in memory, for example, in case the agent 558 is needed again in the future.

If there is more work for the background service 554 to do, it returns to obtain the participation of application code, as described above. Otherwise, once the service request has been satisfied (or the user indicates that the experience is to stop, either explicitly or implicitly), the resource reservation is released and the request is considered complete.

Note that at any point in time, the user may return to an instance of the foreground application 552 and further interact with the background service 554 or with the background agent 558 itself, either directly or indirectly via system events and so on. Additionally, the user may use system UX, such as universal playback controls, in order to influence the background service (e.g., skip to next track), which in turn may call into the background agent to fulfill the work item.

Figure 6:
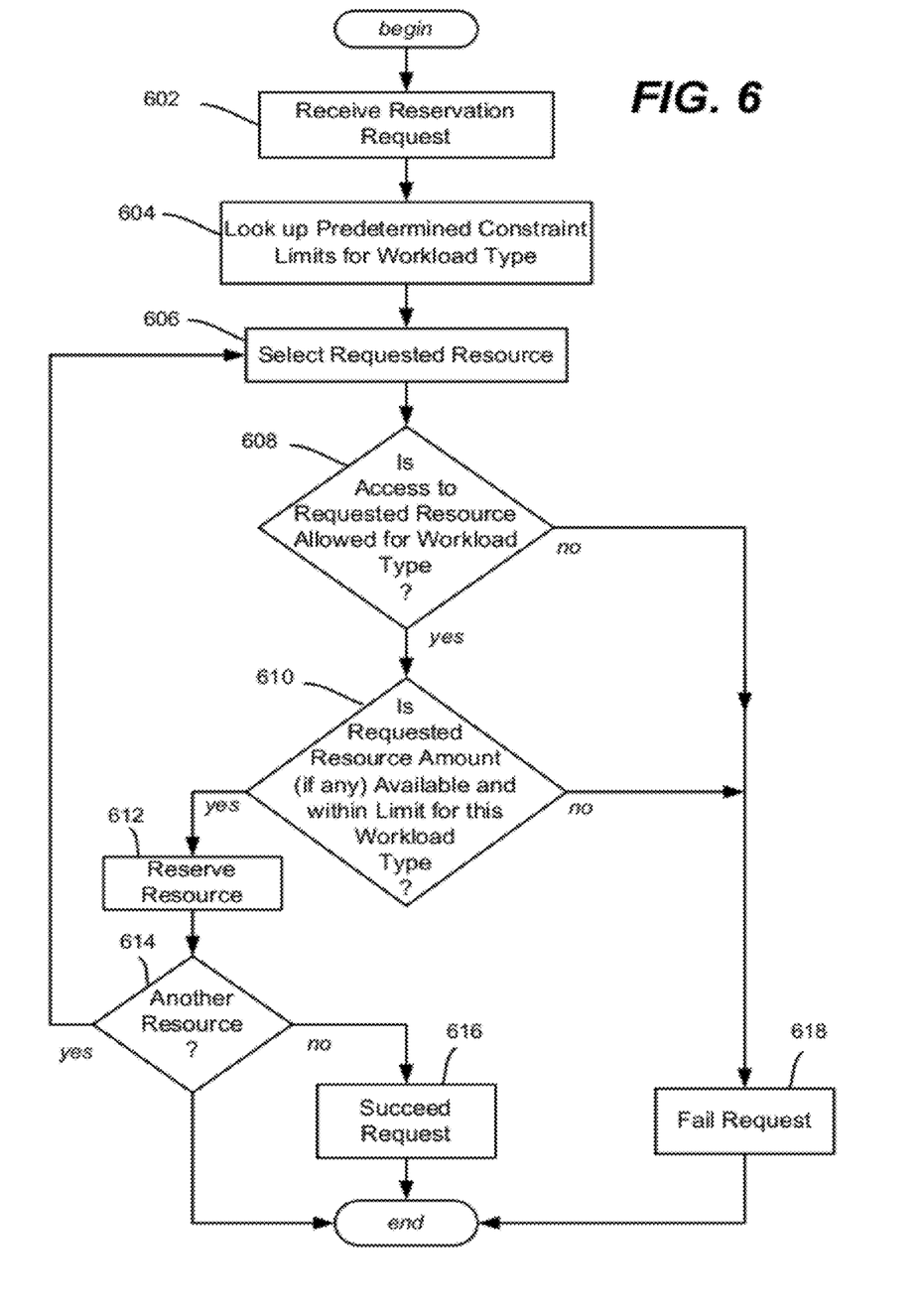
FIG. 6 is a flow diagram representing example steps directed towards providing background code execution in a mobile device.

By way of summary, FIG. 6 is a flow diagram showing example steps related to processing a reservation request for a background workload, beginning at step 602 where the request is received. Step 604 represents the system looking up the policy criteria for this type of background workload, e.g., which resources are allowed, and of those, what are the limits (if any) for each resource. For example, a background audio agent needs some (predetermined reasonable) amount of memory and some amount of CPU and possibly other resources, but does not need the screen display. A turn-by-turn direction background agent needs some memory and CPU, as well as access to the GPS sensor data, but also does not need the screen display.

Step 606 selects a resource from the reservation tuple, which step 608 evaluates to determine whether the requested resource is allowed for this type of workload. If not, the process ends at step 618 by failing the request.

If allowed, step 610 evaluates whether the requested resource amount (if any) is available, and within policy constraint limits, e.g., only so much percentage CPU, only so much memory, and so on. Note that some resources are either allowed or denied access, e.g., memory is limited, but GPS data is not (as it is either accessible or not), and thus step 610 does not apply to such resources. Note that it is generally equivalent to consider resource availability as being part of whether the policy criteria is met, or as a separate condition that needs to be met in addition to the policy criteria.

If the requested amount is within any predetermined allowed amount limit, and is currently available, the resource is reserved at step 612. If the requested resource is not available or the predetermined allowed amount (if any) is exceeded, step 610 branches to step 618 where the process ends by failing the request.

Step 614 repeats the process for other resources in the reservation tuple, e.g., evaluating each one in order. When the requested resources are reserved for a reservation request, the request succeeds at step 616. At that time, the background agent may be launched; thereafter it may be denied access to resources beyond those initially reserved, e.g., in one implementation, a background agent is not allocated more memory (if requested while running) beyond that initially reserved.

Exemplary Operating Environment

Figure 7:
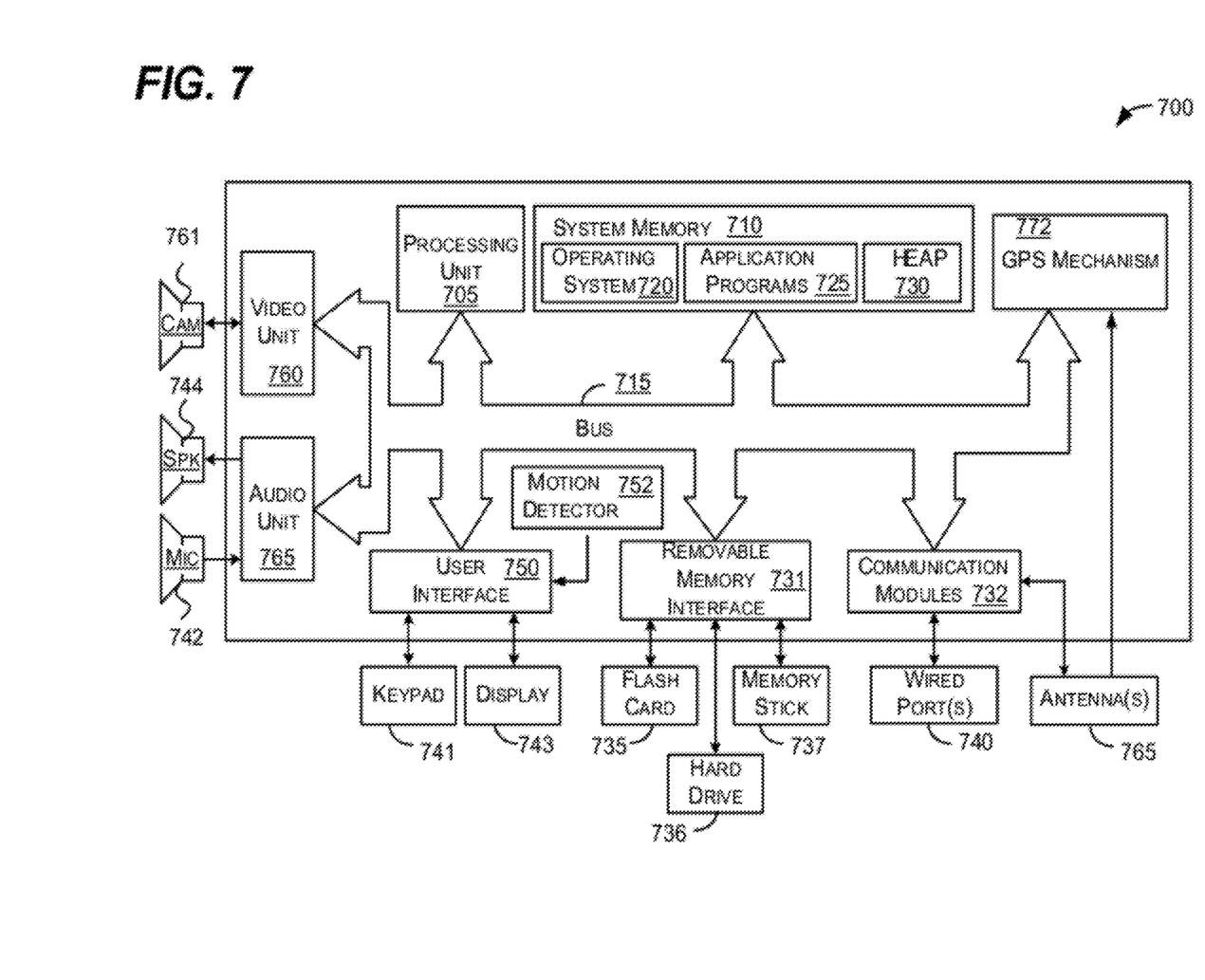
FIG. 7 is a block diagram representing an exemplary non-limiting computing system or operating environment, e.g., in the example of a mobile phone device, in which one or more aspects of various embodiments described herein can be implemented.

FIG. 7 illustrates an example of a suitable mobile device 700 on which aspects of the subject matter described herein may be implemented. The mobile device 700 is only one example of a device and is not intended to suggest any limitation as to the scope of use or functionality of aspects of the subject matter described herein. Neither should the mobile device 700 be interpreted as having any dependency or requirement relating to any one or combination of components illustrated in the exemplary mobile device 700.

With reference to FIG. 7, an exemplary device for implementing aspects of the subject matter described herein includes a mobile device 700. In some embodiments, the mobile device 700 comprises a cell phone, a handheld device that allows voice communications with others, some other voice communications device, or the like. In these embodiments, the mobile device 700 may be equipped with a camera for taking pictures, although this may not be needed in other embodiments. In other embodiments, the mobile device 700 may comprise a personal digital assistant (PDA), hand-held gaming device, notebook computer, printer, appliance including a set-top, media center, or other appliance, other mobile devices, or the like. In yet other embodiments, the mobile device 700 may comprise devices that are generally considered non-mobile such as personal computers, servers, or the like.

Components of the mobile device 700 may include, but are not limited to, a processing unit 705, system memory 710, and a bus 715 that couples various system components including the system memory 710 to the processing unit 705. The bus 715 may include any of several types of bus structures including a memory bus, memory controller, a peripheral bus, and a local bus using any of a variety of bus architectures, and the like. The bus 715 allows data to be transmitted between various components of the mobile device 700.

The mobile device 700 may include a variety of computer-readable media. Computer-readable media can be any available media that can be accessed by the mobile device 700 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 700.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 710 includes computer storage media in the form of volatile and/or nonvolatile memory and may include read only memory (ROM) and random access memory (RAM). On a mobile device such as a cell phone, operating system code 720 is sometimes included in ROM although, in other embodiments, this is not required. Similarly, application programs 725 are often placed in RAM although again, in other embodiments, application programs may be placed in ROM or in other computer-readable memory. The heap 730 provides memory for state associated with the operating system 720 and the application programs 725. For example, the operating system 720 and application programs 725 may store variables and data structures in the heap 730 during their operations.

The mobile device 700 may also include other removable/non-removable, volatile/nonvolatile memory. By way of example, FIG. 7 illustrates a flash card 735, a hard disk drive 736, and a memory stick 737. The hard disk drive 736 may be miniaturized to fit in a memory slot, for example. The mobile device 700 may interface with these types of non-volatile removable memory via a removable memory interface 731, or may be connected via a universal serial bus (USB), IEEE 7394, one or more of the wired port(s) 740, or antenna(s) 765. In these embodiments, the removable memory devices 735-737 may interface with the mobile device via the communications module(s) 732. In some embodiments, not all of these types of memory may be included on a single mobile device. In other embodiments, one or more of these and other types of removable memory may be included on a single mobile device.

In some embodiments, the hard disk drive 736 may be connected in such a way as to be more permanently attached to the mobile device 700. For example, the hard disk drive 736 may be connected to an interface such as parallel advanced technology attachment (PATA), serial advanced technology attachment (SATA) or otherwise, which may be connected to the bus 715. In such embodiments, removing the hard drive may involve removing a cover of the mobile device 700 and removing screws or other fasteners that connect the hard drive 736 to support structures within the mobile device 700.

The removable memory devices 735-737 and their associated computer storage media, discussed above and illustrated in FIG. 7, provide storage of computer-readable instructions, program modules, data structures, and other data for the mobile device 700. For example, the removable memory device or devices 735-737 may store images taken by the mobile device 700, voice recordings, contact information, programs, data for the programs and so forth.

A user may enter commands and information into the mobile device 700 through input devices such as a key pad 741 and the microphone 742. In some embodiments, the display 743 may be touch-sensitive screen and may allow a user to enter commands and information thereon. The key pad 741 and display 743 may be connected to the processing unit 705 through a user input interface 750 that is coupled to the bus 715, but may also be connected by other interface and bus structures, such as the communications module(s) 732 and wired port(s) 740. Motion detection 752 can be used to determine gestures made with the device 700.

A user may communicate with other users via speaking into the microphone 742 and via text messages that are entered on the key pad 741 or a touch sensitive display 743, for example. The audio unit 755 may provide electrical signals to drive the speaker 744 as well as receive and digitize audio signals received from the microphone 742.

The mobile device 700 may include a video unit 760 that provides signals to drive a camera 761. The video unit 760 may also receive images obtained by the camera 761 and provide these images to the processing unit 705 and/or memory included on the mobile device 700. The images obtained by the camera 761 may comprise video, one or more images that do not form a video, or some combination thereof.

The communication module(s) 732 may provide signals to and receive signals from one or more antenna(s) 765. One of the antenna(s) 765 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 772. In turn, the GPS mechanism 772 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 700 may connect to one or more remote devices. The remote devices may include a personal computer, a server, a router, a network PC, a cell phone, a media playback device, a peer device or other common network node, and typically includes many or all of the elements described above relative to the mobile device 700.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising:
   receiving, from an application, a reservation request that requests device resources for background code;
   determining prior to scheduling the reservation request whether policy criteria is met for the reservation request, including that sufficient resources are available to ensure that the background code is able to have priority use of the device resources being requested, wherein said determining comprises determining for at least some of the device resources whether those requested device resources are within constraint limits for a type of background code corresponding to the reservation request, and if not, failing the reservation request or revising requirements of the requested device resources;
   if the policy criteria is met, reserving the device resources for use by the background code to allow the background code to run as background code and use the device resources, wherein a request for an additional resource is denied for the background code while running the background code; and
   managing a lifecycle of the background code, including launching a background agent corresponding to at least part of the background code into an active state in which the background agent executes, and moving the background agent between an inactive state, in which the background agent does not execute, and the active state, wherein the background agent executes the background code after the application is closed.

2. The method of claim 1 wherein the background agent is independent from the application.

3. The method of claim 1 wherein receiving the reservation request comprises receiving a request corresponding to CPU and memory resource quotas.

4. The method of claim 1 wherein determining whether the policy criteria is met for the reservation request further comprises determining for at least one resource whether that resource is allowed to be used by the background code.

5. The method of claim 1 further comprising, reserving the device resources for a system code and a foreground code.

6. The method of claim 1 wherein the policy criteria include data corresponding to a CPU usage limit or a memory allocation limit, or both, for the type of background code associated with the reservation request.

7. The method of claim 1 wherein the policy criteria include data corresponding to a network bandwidth limit or a non-volatile storage I/O limit, or both, for the type of background code associated with the reservation request.

8. The method of claim 1 wherein the resources include at least one of CPU, memory, network bandwidth, non-volatile storage bandwidth, a screen display, a device microphone, a device camera, a device accelerometer, a device gyroscope, a device GPS mechanism, or any combination of CPU, memory, network bandwidth, non-volatile storage bandwidth, a screen display, a device microphone, a device camera, a device accelerometer, a device gyroscope, or a device GPS mechanism.

9. In a computing environment, a system comprising:
   memory;
   at least one processor;
   the at least one processor and memory configured to execute a resource manager, the resource manager configured to constrain resource usage by running background code, including by evaluating policy criteria and resource availability against a resource reservation request, received from an application, to determine whether to reserve requested resources for the background code; and if the policy criteria is met and the resources are available, the resource manager reserving the resources for the background code and indicating that the reservation request is successful, and if not, the resource manager failing the resource reservation request or revising requirements of the requested resources; and further wherein the resource manager denies a request for an additional resource for the background code while running the background code; and an application instance manager configured to manage a lifecycle of the background code, including launching a background agent corresponding to at least part of the background code into an active state in which the background agent executes, and moving at least part of the background code between an active state in which the background code executes and an inactive state in which the background code does not execute, wherein the background agent executes the background code after the application is closed.

10. The system of claim 9 wherein the application instance manager is further configured to launch an instance of the background code for execution when the reservation request is successful.

11. The system of claim 9 wherein the policy criteria include data corresponding to a CPU usage limit or a memory allocation limit, or both, for the type of background code associated with the resource reservation request.

12. The system of claim 9 wherein the policy criteria include data corresponding to a network bandwidth limit or a non-volatile storage I/O limit, or both, for the type of background code associated with the resource reservation request.

13. The system of claim 9 wherein the policy criteria include data identifying which device resources are allowed access or denied access, or both, for the type of background code associated with the resource reservation request.

14. The system of claim 9 wherein the resource manager reserves resources for system code, foreground code and background code, the resources including at least one of CPU, memory, network bandwidth, non-volatile storage bandwidth, a screen display, a device microphone, a device camera, a device accelerometer, a device gyroscope, a device GPS mechanism, or any combination of CPU, memory, network bandwidth, non-volatile storage bandwidth, a screen display, a device microphone, a device camera, a device accelerometer, a device gyroscope, a device GPS mechanism.

15. The system of claim 9 wherein the resource manager is further configured to ensure that the background agent has a highest priority access to the resources within its own bounding box.

16. One or more computer-readable storage media having computer-executable instructions, which when executed perform steps, comprising:

receiving, from an application, a reservation request that requests device resources for background code;

determining prior to scheduling the reservation request whether policy criteria is met for the reservation request, including that sufficient resources are available to ensure that the background code is able to have priority use of the device resources being requested, wherein said determining comprises determining for at least some of the device resources whether those requested device resources are within constraint limits for a type of background code corresponding to the reservation request, and if not, failing the reservation request or revising requirements of the requested device resources:

if the policy criteria is met, reserving the device resources for use by the background code to allow the background code to run as background code and use the device resources, wherein a request for an additional resource is denied for the background code while running the background code; and managing a lifecycle of the background code, including launching a background agent corresponding to at least part of the background code into an active state in which the background agent executes, and moving the background agent between an inactive state, in which the background agent does not execute, and the active state, wherein the background agent executes the background code after the application is closed.

17. The one or more computer-readable storage media of claim 16 wherein the background agent communicates with a system service to perform at least one background task.

18. The one or more computer-readable storage media of claim 16 having further computer-executable instructions comprising, suspending or terminating the background agent.

19. The one or more computer-readable storage media of claim 16 wherein determining whether the policy criteria is met for the reservation request further comprises determining for at least one resource whether that resource is allowed to be used by the background code.

20. The one or more computer-readable storage media of claim 16 wherein the application comprises at least one of a media playback application, a location tracking application, a data syncing application, a VoIP calling application, or a turn-by-turn directions application.

* * * * *